2,816,914
DIMERIZATION PROCESS
Charles E. Frank, Cincinnati, Ohio, and John R. Leebrick, Elizabeth, N. J., assignors to National Distillers and Chemical Corporation, a corporation of Virginia
No Drawing. Application May 9, 1956,
Serial No. 583,606
11 Claims. (Cl. 260—515)

The present invention relates to a process for production of dimerized products from vinyl aromatic compounds and, more particularly, to a process wherein a suitable vinyl aromatic hydrocarbon compound is reacted with an alkali metal to produce, in selective manner and in high yields, dimerized products of the vinyl aromatic compound. More particularly, the process embodied herein relates to a process wherein a vinyl aromatic compound containing a —HC=CH$_2$ group, such as styrene, is reacted with an alkali metal under conditions whereby the vinyl aromatic compound is selectively dimerized to produce high yields of dialkali metal derivatives of the dimerized vinyl aromatic compound with subsequent carbonation of said derivatives to salts of aromatic substituted acids which may be readily converted to diacids and isolated as such, if desired.

In a co-pending application, S. N. 394,497 filed November 25, 1953, a process is disclosed in which a vinyl aromatic compound, such as styrene and ring-substituted styrenes, is reacted with a finely dispersed alkali metal, in the presence of a suitable liquid reaction medium and in the presence of a relatively small amount of a polycyclic aromatic compound under conditions whereby the vinyl aromatic compound is selectively dimerized with formation in appreciable yields of the corresponding dimetallo derivatives of dimers of the vinyl aromatic hydrocarbon. In the use of styrene as the vinyl aromatic compound, there is thereby selectively produced in high yields the dialkali metal derivatives of dimers of styrene which upon carbonation to form the corresponding salts, and liberation of the diacids from the resulting salts, yields a product comprised predominantly of 2,5-diphenyl-1,6-hexane-dioic acid (2,5-diphenyladipic acid). Though other isomeric diacids may theoretically be obtained from such a styrene reaction, studies of the diacid product thus obtained reveal that such other isomers, if obtained, are normally only in negligible amount. Such other possible isomers include 3,4-diphenyl-1,6-hexanedioic acid and 2,4-diphenyl-1,6-hexanedioic acid. Hence, under the reaction conditions described in the co-pending application, the dimerization or coupling of the styrene type compounds not only proceeds selectively but, in addition, does so in a manner to yield the desired product, i. e., the isomer that upon carbonation and acidification yields 2,5-diphenyladipic acid.

The vinyl aromatic compounds which are useful for the described process, as well as the process embodied herein and described more fully hereinafter, comprise styrene and ring-substituted styrenes such, for example, the ortho, meta and para methyl styrenes, the ethyl styrenes, and the like. In general, it is desirable to use styrene and alkyl substituted styrenes in which the alkyl group or groups have from one to four carbon atoms; however, aryl substituted styrenes may also be employed. If the vinyl aromatic reactant used is other than styrene, then the dimetallic derivatives corresponding to the other structures are obtained. A generalized formula for dimetallo derivatives as produced by the described process follows:

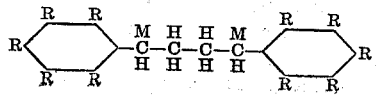

in which the R groups need not all be similar and may represent either an alkyl group of from one to four carbon atoms or a hydrogen atom. The M represents an atom of the alkali metal used for the selective dimerization reaction.

In the aforesaid co-pending application, it is set forth that one essential factor for effecting the selective dimerization reaction is the use of the alkali metal in finely divided form and, desirably, as a dispersion in which the alkali metal has a particle size of less than 50 microns. As specific embodiments thereof, said co-pending application discloses such dispersions in which the alkali metal particles are in the 5–15 micron range as well as such dispersions in which the average particle size of the alkali metal is about 20 microns. Such dispersions are, for purposes of convenience, hereinafter designated as normal dispersions.

Studies carried out with such normal dispersions under the reaction conditions described in said co-pending application have revealed that to effect the desired selective dimerization of the suitable vinyl aromatic compounds, the reaction requires the presence of a polycyclic aromatic hydrocarbon compound in a small amount. Such compounds, as are also disclosed in the co-pending application, include both condensed ring hydrocarbons such as naphthalene and phenanthrene, as well as the uncondensed polycyclic compounds such as diphenyl, the terphenyls, dinaphthyl, tetraphenyl ethylene and the like, including mixtures of such compounds. Of such compounds, the terphenyls and naphthalene are particularly suitable. In general, and although the amount of the polycyclic aromatic hydrocarbon may be varied over a range which is relatively small in amount based on the amount of the vinyl aromatic compound undergoing dimerization, with the actual amount of the polycyclic compound being dependent on temperature, time of reaction, the particular vinyl aromatic compound employed, and the like, concentrations in the range of 0.1 to 10 weight percent based on the amount of vinyl aromatic compound are ordinarily quite sufficient.

Although the process described in the aforesaid co-pending application provides a particularly effective method for reacting a vinyl aromatic compound with an alkali metal to produce selectively and in high yields dialkali metal derivatives of dimers of the vinyl aromatic compound, desiderata are the production of such derivatives in selective manner and in high yields with minimization of the number of required ingredients in the mixture undergoing dimerization reaction and facilitation of subsequent handling operations, which may be complicated by the presence of certain ingredients, in the conversion to and recovery of desired valuable derivatives of the dimerized product. For example, desiderata include the provision of a method for reacting the vinyl aromatic compound with an alkali metal under conditions for selective production in relatively high yields of dialkali metal derivatives of dimers of the vinyl aromatic without need of an agent such as the polycyclic aromatic compound, thereby simplifying the entire process by reduction in the required number of ingredients and obviating problems associated with the presence of activating agents, etc. in the preparation and recovery of the dialkali metal dimers and/or desired derivatives thereof.

It is the primary object of this invention to provide a method for selective production in high yields of dialkali metal derivatives of dimers of vinyl aromatic compounds as aforedescribed by reacting such compounds with an alkali metal whereby the desiderata aforediscussed are obtained. Although the process embodied herein, and described more fully hereinafter, does not preclude the use, if desired, of an activating agent such as is disclosed in the aforesaid co-pending application, the process embodied herein can be carried out without need for use of such agents with obtainment of relatively large yields of the desired dimer product and obtainment of other advantages including the avoidance or substantial minimization of the tendency for the alkali metal to agglomerate during the reaction with the vinyl aromatic hydrocarbon compound.

It has now been discovered that a vinyl aromatic hydrocarbon compound as aforedefined can be reacted with an alkali metal in the presence of a selected reaction medium to produce, in selective manner and in high yields, dialkali metal derivatives of dimers of the vinyl aromatic compound if the alkali metal reactant is employed in the form of a dispersion in which the particle size characteristics of the dispersed alkali metal fall within rather well defined limits of size characteristics. As is apparent from the description set forth hereinafter, average particle size characteristics of the alkali metal dispersion is not necessarily the sole factor which enables carrying out the present invention as, over and above average size characteristics, it is essential that the alkali metal dispersion contain in excess of a rather well defined amount of alkali metal particles of relatively small size characteristics. Thus, as will be apparent from the specific embodiments set forth hereinafter for further describing the invention, the desired dimerization reaction can be effected by use of an alkali metal dispersion of particle size characteristics as embodied for use herein whereas the desired dimerization may not be effected by use of an alkali metal dispersion which though it may be of relatively low average particle size characteristics, does not contain the rather well defined amount of particles of controlled size characteristics required for practice of this invention whereby relatively large yields of desired dimer products are obtained without need for use of an activating agent, such as a polycyclic aromatic compound.

Generally speaking, the process embodied herein comprises reacting a vinyl aromatic compound, as aforedefined, in the presence of a suitable reaction medium, with an alkali metal in dispersed form in which substantially more than about 50% of the alkali metal particles are not more than about 3 microns in size; and, more preferably, not more than about 1 micron in size, under conditions whereby there is produced in selective manner high yields of dialkali metal derivatives of dimers of the vinyl aromatic compound. More preferably, the process embodied herein is carried out by use of the alkali metal in the form of a dispersion in which more than about 55% of the alkali metal particles are of three or less microns in size and, the average particle size is not more than about four microns. In a still more preferred embodiment, the invention is carried out by use of the alkali metal in the form of a dispersion in which (a) more than about 75% of the alkali metal particles are not more than about three microns in size, and preferably not more than about one micron, (b) the average particle size of the dispersion is not more than about one micron, and (c) the dispersion is devoid of more than about 5% of alkali metal particles larger than about 15 microns in size. Optimum results are generally obtained by use of an alkali metal dispersion in which all or substantially all of the alkali metal particles do not exceed about 3 microns in size and the average particle size is one, and preferably less microns.

For carrying out the process embodied herein, examples of the alkali metal reactant include sodium potassium and lithium with sodium being preferred as it provides for excellent selectivity and yields of desired dimerized product and is cheaper and more readily available. Use of chemically pure sodium is not essential, however, as mixtures containing a substantial amount of sodium are useful as are alloys of sodium and potassium, of sodium and calcium, and of sodium and lithium.

The most suitable reaction medium consists essentially of an ether, and certain types of ethers are especially effective. These particular classes of ethers have the common property of serving as promoters for the dimerization. The ether can be any aliphatic mono ether having a methoxy group, in which the ratio of the number of oxygen atoms to the number of carbon atoms is not less than 1:4, and which will not be cleaved during the reaction period to produce sufficient catalytic cleavage products to consumer appreciable amounts of the vinyl aromatics by polymerization side reactions. Examples include dimethyl ether, methyl ethyl ether, methyl n-propyl ether, methyl isopropyl ether, and mixtures of these methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, methyl butyl, ethyl butyl, dibutyl, and butyl lauryl ethylene glycol ethers; trimethylene glycol dimethyl ether, glycerol trimethyl ether, and glycerol dimethyl ethyl ether. The simple methyl monoethers, as dimethyl ether, and the polyethers of ethylene glycols, such as ethylene glycol dimethyl ether are preferred.

The ethers should not contain any groups such as hydroxyl, carboxyl and the like which are distinctly reactive towards sodium. Although the ether may react in some reversible manner, it must not be subject to cleavage to give irreversible reaction products during the dimerization process. Such cleavage action destroys the ether and introduces into the reacting system metallic alkoxides which, in turn, tend to induce polymerization reaction rather than the desired dimerization reaction.

Although the reaction medium should consist essentially of the specified ethers, other inert media can be employed in limited amounts. In general, these inert media will be introduced with the alkali metal dispersion as the vehicles in which the alkali metal is suspended. They have the principal effect of diluting the ethers. As the effective concentration of the active ether is decreased by the increased addition of inerts, a minimum concentration of ether is reached below which the promoting effect is not evident. The exact minmium concentration depends upon the particular reactants and ether being used as well as the reaction conditions, such as temperature, reactant concentration, and the like employed. In any event, the concentration of ether in the reaction mixture should at all times be maintained at a sufficient level to have a substantial promoting effect upon the dimerization reaction. In general, it is good practice to use a reaction medium having at least 50 weight percent of active ether. Although the amount may be varied considerably, from 100 to 2000 cc. of the ether per mole of the vinyl aromatic undergoing reaction has been found satisfactory.

In preparation of the alkali metal dispersion, it is desired to employ at least one or more dispersing agents capable of promoting rapid and complete breakdown of the gross sodium particles. Choice of these dispersing aids is important, although a number of different selected materials can be used. In one system, copper oleate is used for maximum rapid particle breakdown, and dimer acid for maximum dispersion stability. Aluminum stearate, as well as other selected metallic soaps have also been found to function quite satisfactorily. For optimum flow characteristics of the initial dispersion, other materials can also be used either alone or in combinations. Dispersing aids which are useful include dimer acid, oleic acid, aluminum stearate, aluminum octanoate, calcium stearate, aluminum laurate, lead naphthenate, zinc stearate and other metallic soaps as well as lecithin, polymers, rubbers, etc.

In practice of the process embodied herein, the reaction temperature is preferably held below 0° C., and more preferably, between −20° C. to −50° C. as generally speaking, all ethers begin to yield cleavage products at temperatures of about 0° C. and above with the result that sufficient alkoxides are formed to yield products other than the desired low molecular weight dimers. However, and depending on the particular reaction medium employed, the reaction may be carried out at somewhat higher temperatures, with or without use of pressure, such as up to about 30° C., but use of the higher temperatures are generally not preferred as the yield of desired products tends to decrease as the temperature is increased over about 0° C.

The process embodied herein may be carried out in batch-wise, semi-continuous or continuous manner and it is not intended to be limited to any particular method of operation. For example, the reaction may be carried out in a stirred reaction vessel in which the ether reaction medium and alkali metal dispersion are maintained at desired temperature (e. g., below about 0° C.) and the vinyl aromatic reactant introduced thereinto. One quite satisfactory method is to introduce the vinyl aromatic into the reaction vessel at approximately the same rate at which it reacts with the alkali metal. Using the finely dispersed alkali metal, it is usually suitable to employ only an equimolar amount with the vinyl aromatic to be reacted. The dimetallic derivatives of the desired dimers which are selectively formed are thus produced in the reaction mixture.

They can either be isolated as such, or, since they tend to be unstable and difficult to handle, they can be directly and immediately thereafter subjected to further reactions to form valuable derivatives. For example, subsequent carbonation of the mixture containing the products yields the salts of dicarboxylic acids. The carbonation may be done by subjecting the dimetallic derivatives to dry gaseous carbon dioxide or by contact with solid carbon dioxide. The temperature should be controlled below 0° C. to avoid formation of large amounts of unwanted by-products and decomposition of the intermediates. These salts will contain two more carbon atoms than the dimetallic dimers from which they are produced. In the case where styrene is the starting vinyl compound, there results by this method the selective production of diphenyl-1,6-hexanedioic acids, the 2,5-diphenyl-1,6-hexanedioic acid isomer predominating in the products. Both the meso and racemic dl mixture are produced. In the case where the vinyl toluenes are the starting vinyl aromatic materials, there results as the final product after carbonation, a mixture of the isomeric ditolyl adipic acids.

It is important, when producing the diacids and their salts to carry out the dimerization and carbonation as two separate steps. The dimetallic dimer is first made and the carbonation is done as soon afterwards as possible.

As a suitable method for preparation of alkali metal dispersions suitable for practice of this invention, an inert hydrocarbon is placed in a suitable vessel with the appropriate amount of alkali metal (e. g., sodium), suitable materials useful as the inert hydrocarbon being dibutyl ether, n-octane, isooctane, toluene, xylene, naphthalene, n-heptane, straight run kerosenes, etc. The mixture is then heated in a surrounding bath or otherwise until the sodium has melted (M. P. 97.5° C.). A suitable high speed agitator is then started and, preferably, an emulsifier consisting, for example, of ½% (based on sodium) of the dimer of linoleic acid is added. After a short period of agitation, a dispersion of sodium particles in the range of 5–15 microns is normally obtained (i. e., normal dispersions illustrative of finely dispersed sodium which, for obtaining substantial yields of the desired dimerized products, require use of an activating agent in the reaction with the vinyl aromatic compound).

A suitable mill, such as a homogenizer, is preheated by placing a small amount of inert hydrocarbon (e. g., mineral spirits) in the retention pot and running the mill until the liquid reaches a temperature in the range of 105–115° C. When such a temperature has been reached, the above described preformed "Normal dispersion" is added to the retention pot while the mill is continued in operation. Preferably, the vehicle for the dispersion and the small amount used for pre-heating the homogenizer mill are calibrated and accounted for so that a sodium concentration of from about 10 to about 60%, and preferably 20–50%, is maintained for preparation of final finished dispersions of highly suitable stability characteristics. The selective dispersing aid or aids that are employed can be incorporated by adding only a portion of the total amount thereof to the mixture while forming the "normal dispersion" and adding the remainder to the initial diluent charge in the homogenizer mill prior to addition thereto of the normal dispersion. On the other hand, all of the dispersing aids can be added to the pre-formed dispersion before its addition to the homogenizer equipment. By such a two-step process, the normal dispersions can be converted to dispersions in which the maximum size of the particles of sodium do not exceed about 3 or 4 microns with an average micron size of 1 micron or less and which, for purposes herein are illustrative of the "fine dispersions" utilized in describing specific embodiments of the invention. For preparation of such dispersions, other dispersion units, including those of the ultrasonic type, may be used and which operate successfully with either a preformed dispersion or molten sodium feed.

In order to further describe the invention, the following tabulation sets forth results obtained by carrying out embodiments of the invention and, for comparison purposes, results obtained by carrying out the process under identical conditions except for use of an alkali metal dispersion which, though of low average particle size, does not contain the aforestated amount of particles that do not exceed, and preferably are below about 3 microns in size required for practice of this invention. In the described embodiments, utilized for purposes of illustration and not limitation, all parts are expressed by weight unless otherwise specified.

Although the invention is illustrated with use of specific embodiments using sodium as the alkali metal, dimethyl ether as the reaction medium, styrene as the vinyl aromatic reactant and mineral spirits as the suspension medium, it should be understood that their use is for illustrative and not limitative purposes as the process embodied herein may be carried out with use of other alkali metals, vinyl aromatics, reaction mediums, suspension mediums and other reaction conditions as is more broadly described hereinbefore.

The sodium dispersions employed in the runs for which data are shown in the tabulation consisted of a normal dispersion, a fine dispersion (30% sodium) prepared as aforedescribed in mineral spirits, and controlled mixtures of such dispersions, the particle size characteristics of which were determined by visual examination with a microscope having a calibrated eyepiece. The reactions for which data are set forth in the following tabulation were carried out in a stirred reactor having a gas inlet tube and a reflux condenser vented to a nitrogen atmosphere. The reactor system was purged with nitrogen and charged with 3 liters of dimethyl ether, followed by addition of the sodium dispersion (0.75 g. atoms). Styrene (0.75 g. mole) was then passed into the reactor with stirring over a 60 minute period at a temperature of about −30° C. Following completion of the reaction, the reaction mixture was carbonated by pouring it upon an excess of solid carbon dioxide. After evaporation of excess carbon dioxide, dimethyl ether and alkylate, the remaining product was acidified with hydrochloric acid. The acidified product was, in each case, analyzed to determine the amount of its content of diphenyladipic acid, based on the amount of reacted styrene.

| Run No. | Percent sodium dispersion | | Average particle size | Percent of particles 3 or less microns | Yield of diacid base on styrene |
|---|---|---|---|---|---|
| | Fine dispersion [1] | Normal dispersion [2] | | | |
| 1 | 100 | 0 | Not more than about 1 micron | 100 | 68 |
| 2 | 75 | 25 | About 4 microns | 77.5 | 37 |
| 3 | 50 | 50 | About 6 microns | 55 | 0 |
| 4 | 0 | 100 | About 12 microns | 10 | 0 |

[1] Average=not more than about 1 micron. Maximum particle size=about 3 microns.
[2] Average=about 12 microns. Maximum particle size=about 30 microns. Particles over about 15 microns=not more than 10%. Particles of 3 microns or below=not more than 5-10%.

As is apparent from the data in the foregoing tabulation, use of the sodium reactant in the form of a normal dispersion of 12 micron average (run No. 4) did not result in formation of disodio derivatives of the dimer of styrene in view of the failure to obtain diphenyladipic acid upon carbonation and acidification of the reaction mixture. Moreover, as shown for run No. 3, wherein the sodium dispersion was the defined mixture of the fine dispersion and normal dispersion, but in which the amount of 3 microns or less sodium particles was on the order of only about 55%, no production of diphenyladipic acid occurred. However, as shown for the remaining runs, Nos. 1 and 2, the use of a sodium dispersion in which substantially more than 75% of the sodium particles were of 3 or less microns, diphenyladipic acid in relatively high yields was obtained.

Most preferred practice of the invention is illustrated by the results shown for run No. 1 wherein, by use of a sodium dispersion of particles devoid of particles over about 3 microns in size, and having an average of not more than about one micron, a 68% yield (based on styrene) of diphenyladipic acid was obtained.

Over and above the decided advantages that result from the present invention, including the effecting of substantial dimerization of the vinyl aromatics with alkali metals without need for resort to use of activating agents, etc., and the resulting simplification of the process, the use of alkali metal dispersions, as embodied for use herein, obviates or substantially minimizes the agglomeration or lump-forming tendency of dispersed sodium, the occurrence of which requires, while carrying out reactions therewith, more frequent shutdowns due to plug-up of equipment, transfer lines, etc. Thus, based on studies of agglomerate-forming tendencies of dispersed sodium in a process as embodied herein, use of the sodium as a dispersion of the required particle size characteristics for practice of this invention has resulted in obviating balling or agglomeration of sodium for much longer period of time than in the case of carrying out the reaction with normal sodium dispersions.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for preparation of dialkali metal derivatives of dimers of a vinyl aromatic hydrocarbon compound which comprises reacting a vinyl aromatic hydrocarbon compound from the group consisting of styrene and styrene having an alkyl substituent for a nuclear hydrogen atom, in the presence of an ether-containing reaction medium, with an alkali metal in dispersed form in which more than about 50% of the alkali metal particles are not more than about 3 microns in size, said ether being selected from the group consisting of aliphatic monoethers having a methoxy group and an oxygen to carbon ratio of not less than 1:4 and polyethers derived from an aliphatic polyhydric alcohol having all the hydroxyl hydrogen atoms replaced by alkyl groups and mixtures thereof.

2. A process, as defined in claim 1, wherein the vinyl aromatic hydrocarbon is styrene.

3. A process, as defined in claim 1, wherein the vinyl aromatic hydrocarbon is styrene, the alkali metal is sodium, and the reaction is carried out at a temperature below about 0° C.

4. A process, as defined in claim 1, wherein the ether is dimethyl ether.

5. A process for preparation of disodio derivatives of dimers of styrene which comprises reacting styrene with finely divided sodium in presence of an ether reaction medium from the group consisting of aliphatic monoethers having a methoxy group and an oxygen to carbon ratio of not less than 1:4 and polyethers derived from an aliphatic polyhydric alcohol having all the hydroxyl hydrogen atoms replaced by alkyl groups, and mixtures thereof, said reaction being carried out at a temperature of below about 0° C. and the sodium reactant being in the form of finely divided particles of which substantially more than about 50% are not more than about 3 microns in size.

6. A process, as defined in claim 5, wherein the ether is dimethyl ether.

7. A process, as defined in claim 5, wherein the finely divided sodium is in the form of particles of which substantially more than about 50% are not more than about 3 microns in size, and the average particle size of the sodium particles does not exceed about four microns.

8. A process, as defined in claim 5, wherein the finely divided sodium is in the form of particles of which substantially more than about 50% are not more than about three microns in size and the average particle size of the sodium particles does not exceed about one micron.

9. A process, as defined in claim 5, wherein the finely divided sodium is in the form of particles of which more than about 75% of the particles are not more than about three microns in size, the average size of the sodium particles is not more than about one micron, and devoid of more than about 5% of particles larger than about 15 microns in size.

10. A process, as defined in claim 5, wherein the sodium reactant consists substantially of sodium particles of not more than about three microns in size and the average particle size of the sodium is less than one micron.

11. A process, as defined in claim 5, wherein the reaction product comprises a disodio derivative of a dimer of styrene, and said product is subjected to carbonation to convert said derivative to a disodio salt of diphenyladipic acid.

References Cited in the file of this patent

UNITED STATES PATENTS

| 2,171,867 | Scott et al. | Sept. 5, 1939 |
| 2,352,461 | Walker | June 27, 1944 |

FOREIGN PATENTS

| 1,093,096 | France | Nov. 17, 1954 |

OTHER REFERENCES

Conant et al.: J. A. C. S., Vol. 50, pp. 551–8 (1928).
Hansley: Ind. and Eng. Chem., vol. 43, pp. 1759–66 (1951).